(12) United States Patent
Cramer (10) Patent No.: US 11,907,939 B2
(45) Date of Patent: Feb. 20, 2024

(54) METHODS FOR USER AUTHENTICATION USING NON-FUNGIBLE DIGITAL ASSETS

(71) Applicant: James Cramer, Seven Hills, OH (US)

(72) Inventor: James Cramer, Seven Hills, OH (US)

( * ) Notice: Subject to any disclaimer, the term of this patent is extended or adjusted under 35 U.S.C. 154(b) by 76 days.

(21) Appl. No.: 17/396,230

(22) Filed: Aug. 6, 2021

(65) Prior Publication Data
US 2022/0101316 A1  Mar. 31, 2022

Related U.S. Application Data

(60) Provisional application No. 63/062,430, filed on Aug. 6, 2020.

(51) Int. Cl.
*G06Q 20/38* (2012.01)
*G06Q 20/06* (2012.01)

(52) U.S. Cl.
CPC ....... *G06Q 20/3827* (2013.01); *G06Q 20/065* (2013.01); *G06Q 20/3825* (2013.01); *G06Q 20/3829* (2013.01); *G06Q 20/38215* (2013.01)

(58) Field of Classification Search
CPC ............. G06Q 20/3827; G06Q 20/065; G06Q 20/38215; G06Q 20/3825; G06Q 20/3829; G06Q 20/223; G06Q 20/3678; G06Q 20/389; G06Q 20/401; G06Q 20/4016; G06Q 20/02
See application file for complete search history.

(56) References Cited

U.S. PATENT DOCUMENTS

| | | | |
|---|---|---|---|
| 2020/0005284 A1* | 1/2020 | Vijayan | H04L 9/3247 |
| 2021/0105608 A1* | 4/2021 | Mercuri | G06F 21/64 |
| 2022/0414809 A1* | 12/2022 | Geng | H04L 9/50 |
| 2023/0291561 A1* | 9/2023 | Trock | G06Q 20/3829 |
| | | | 713/168 |

* cited by examiner

*Primary Examiner* — Patrick McAtee
*Assistant Examiner* — Incent I Idiake
(74) *Attorney, Agent, or Firm* — Derek Clements (57) ABSTRACT

The present disclosure involves a method for grouping non-fungible digital tokens. The method includes generating a first transaction on a blockchain having an output of a fungible digital token, with the fungible digital token having a first transaction hash identifier. The method further includes assigning the first transaction hash identifier associated with the fungible digital token with a cryptographic public key, and generating a second transaction on the blockchain having an output of a non-fungible digital token and an input. The fungible digital token is spent as the input into the second transaction, with the non-fungible digital token comprising a second transaction hash identifier and a group identifier associated with the first transaction hash identifier.

9 Claims, 6 Drawing Sheets

METHODS FOR USER AUTHENTICATION USING NON-FUNGIBLE DIGITAL ASSETS

CROSS-REFERENCE TO RELATED APPLICATIONS

This application claims priority to U.S. Provisional Application No. 63/062,430 filed Aug. 6, 2020, which is incorporated by reference in its entirety.

FIELD OF THE DISCLOSURE

This disclosure relates to systems and methods for providing a cryptographic platform for grouping non-fungible digital assets, and more specifically, for using non-fungible digital asset tokens for validating access privileges.

BACKGROUND

User authentication is an essential component of all security systems that provide access to electronic or physical resources. Traditional access control systems are maintained by a central authority with a private database. User authentication for these systems typically use either a symmetric password or asymmetric public-key cryptography. Blockchain technology provides a pathway for alternatives to the traditional user authentication schemes.

Publicly accessible blockchains or distributed ledger technology (e.g., Bitcoin, Ethereum, Bitcoin Cash, etc.) provide a way for maintaining an immutable record of digital asset transactions. These transactions can be used in a wide range of applications with smart contracts in addition to the ability to include arbitrary data within the blockchain's transactions. Smart contract and data facilities allow for secondary digital assets, or tokens, to be created on top of the underlying blockchain using standardized token protocols (e.g., ERC-20, ERC-721, Simple Ledger Protocol (SLP), Omni Layer, Counterparty, etc.). These token protocols are used to create new digital assets with different properties, which includes fungible tokens and non-fungible tokens (NFTs). A fungible token refers to a secondary digital asset that has been created with a quantity greater than one and is fungible in the course of making transactions. An NFT is a secondary digital asset which is not fungible and is unique and cannot be counterfeited.

U.S. Pat. App. Pub. No.: 2019/0199531 A1 discloses a basis for an access control system using a blockchain and smart contract that is computed and validated by blockchain. However, this application does not disclose creating non-fungible digital assets that are associated with a single Genesis event, nor using such digital assets as a way for a resource owner to assign, manage, and authenticate user access of a resource.

The disclosed system, method, and device is directed to overcoming one or more of the problems set forth above.

SUMMARY

The disclosure presented herein relates to a method for grouping non-fungible digital tokens. The method includes generating a first transaction on a blockchain having an output of a fungible digital token, with the fungible digital token having a first transaction hash identifier. The method further includes assigning the first transaction hash identifier associated with the fungible digital token with a cryptographic public key, and generating a second transaction on the blockchain having an output of a non-fungible digital token and an input. The fungible digital token is spent as the input into the second transaction, with the non-fungible digital token comprising a second transaction hash identifier and a group identifier associated with the first transaction hash identifier.

The disclosure further relates to a method for using a non-fungible token to authenticate access to an asset. The method includes generating a first transaction on a blockchain having an output of a fungible digital token, with the fungible digital token having a first transaction hash identifier. The method further includes generating a second transaction on the blockchain having an output of a non-fungible digital token and an input. The fungible digital token is spent as the input into the second transaction, and the non-fungible digital token has a second transaction hash identifier and a group identifier associated with the first transaction hash identifier. Further, the method includes requesting access from a user system to an electronic resource database. The electronic resource database storing the asset, or privileges to the asset, and access is granted to the electronic resource database based on the second transaction hash identifier and the group identifier. Then, the method includes, generating a third transaction on the electronic resource database to spend the non-fungible digital asset. In the third transaction, the non-fungible asset is the input and the digital asset is the output, and the transaction creating a third transaction hash identifier. Afterwards, the method includes adding a signed input to the third transaction hash identifier, submitting the third transaction hash identifier to the blockchain for acceptance, and delivering the asset.

Additionally, the disclosure relates to a method for using a smart contract and one or more non-fungible tokens to authenticate access to a digital asset. The method includes generating a first transaction on a blockchain having an output of a non-fungible digital token, with the non-fungible digital token comprises a transaction hash identifier. The method further includes generating a smart contract on a blockchain for the purpose of storing the digital asset, with the smart contract requiring possession or proof of control the non-fungible token to be allowed access and withdraw of the stored digital asset. Additionally, the method includes submitting one or more transactions, on behalf of an owner of the non-fungible digital token, to transfer the digital asset from the smart contract to a different blockchain location, address, or smart contract.

In some embodiments, the preceding and following embodiments and descriptions are for illustrative purposes only and are not intended to limit the scope of this disclosure. Other aspects and advantages of this disclosure will become apparent from the following detailed description.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE DRAWINGS

The preceding and following embodiments and descriptions are for illustrative purposes only and are not intended to limit the scope of this disclosure. Other aspects and advantages of this disclosure will become apparent from the following detailed description.

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DISCRETION

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)–(a second number)," this means a range whose limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

Memory refers to a computer memory, which is any physical device capable of storing information temporally or permanently. For example, Random Access memory (RAM), is a volatile memory that stores information on an integrated circuit used by the operating system, software, and hardware.

A server is a computer that provides data to other computers. It may serve data to systems on a local area network (LAN) or a wide area network (WAN) over the Internet.

A local area network may serve as few as two or three users (for example, in a small-office network) or several hundred users in a larger office. LAN networking comprises cables, switches, routers and other components that let users connect to internal servers, websites and other LANs via wide area networks.

A wide area network (WAN) is a geographically distributed private telecommunications network that interconnects multiple local area networks (LANs).

Wi-Fi is the standard wireless local area network (WLAN) technology for connecting computers and myriad electronic devices to each other and to the Internet. Wi-Fi is the wireless version of a wired Ethernet network, and it is commonly deployed alongside ethernet.

A database (DB) is an electronic filing system, generally in a computer. A collection of information (usually as a group of linked data files) organized in such a way that a program can quickly select pieces of data.

A computer network ("network") is a group of computer systems and other computing hardware devices that are linked together through communication channels to facilitate communication and resource-sharing among a wide range of users A computing device is any electronic equipment controlled by a CPU (Central processing Unit), including desktop and laptop computers, smartphones and tablets. It usually refers to a general-purpose device that can accept software for many purposes in contrast with a dedicated unit of equipment such as a network switch or router.

The blockchain is a public shared ledger maintained by all the nodes within a peer-to-peer network. A blockchain system does not rely on any central trusted authority like traditional banking and payment systems. Instead, trust is achieved as an emergent property from the interactions between nodes within the network. A full copy of the blockchain contains every transaction ever executed within the blockchain network, therefore a party transacting on the blockchain can verify with a high level of certainty that the other party is able to transact as the other party claims.

A smart contract is a self-executing contract with the terms of the agreement between buyer and seller being directly written into lines of code. The code and the agreements contained therein exist across a distributed, decentralized blockchain network. The code controls the execution, and transactions are trackable and irreversible.

A digital token wallet, or cryptocurrency wallet, is a device, physical medium, program or a service which stores the public and/or private keys for cryptocurrency transactions. In addition to this basic function of storing the keys, a cryptocurrency wallet more often also offers the functionality of encrypting and/or signing information. Signing can for example result in executing a smart contract, a cryptocurrency transaction, identification or legally signing a document.

An object of the present disclosure is to provide a resource owner/manager with a way to manage user access to a resource, or resource group with non-fungible tokens. Resources may include digital assets such cloud data, a file, directory access, website monthly subscription, download access, or digital media such as streaming access (e.g., DRM). Resources may also include physical assets such as event tickets, election voting ballots, or ownership or access privileges to a physical object.

Another object of the present disclosure is to provide a method for resource, or asset, owners to assign, manage, and authenticate individual user access using grouped non-fungible tokens (NFTs) on a distributed ledger or blockchain.

Figure 1:
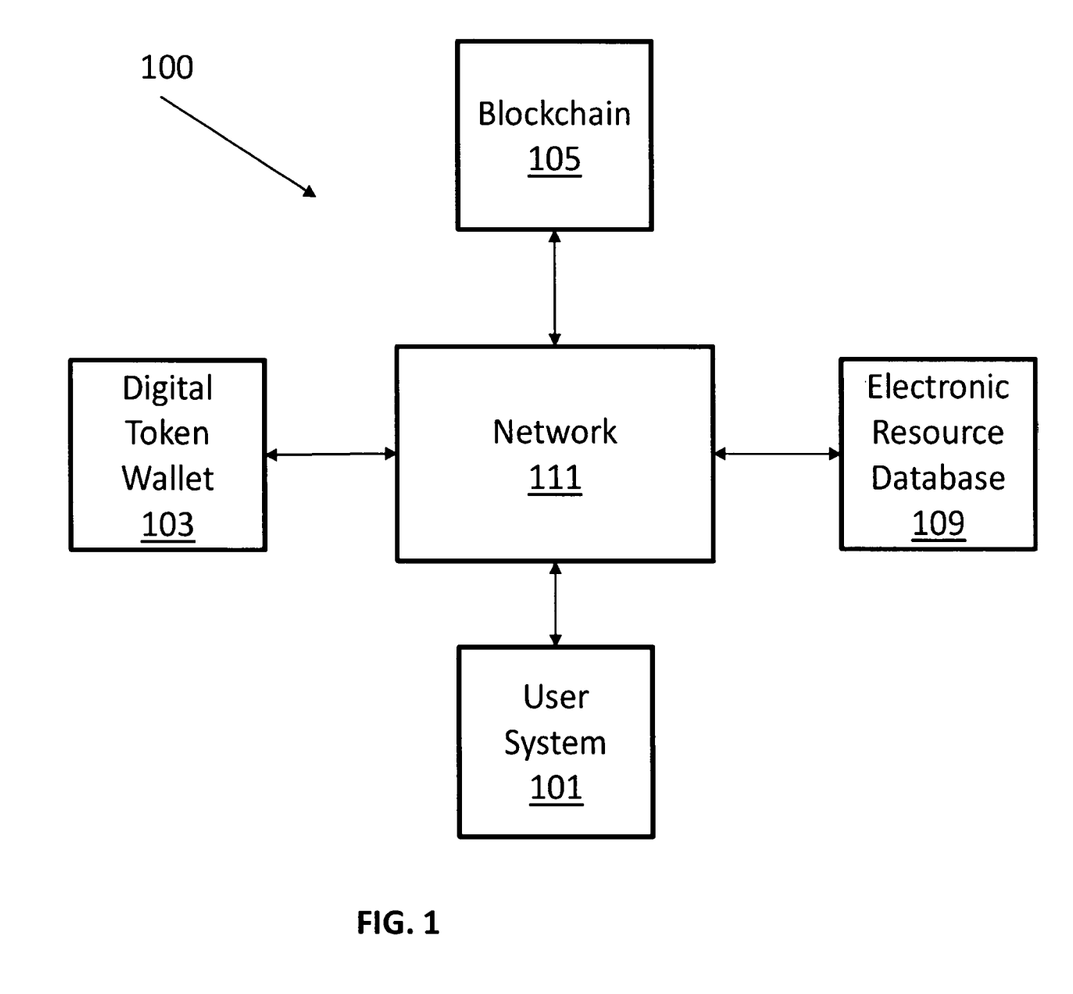
FIG. 1 depicts a block diagram of a computer environment.

Now, referring to the figures, FIG. 1 depicts a block diagram of a computing environment 100 in accordance with one embodiment of the present invention. FIG. 1 provides an illustration of one embodiment and does not imply any limitations regarding the environment in which different embodiments may be implemented. In the depicted embodiment, computing environment 100 includes a network 111, a user system 101, an electronic resource database 108, a digital token wallet 103, and a blockchain 105. As depicted, computing environment 100 provides an environment for the user system 101 to access an asset (discussed below) on the electronic resource database 109 through the network 111, for the blockchain 105 or electronic resource database 109 to access the digital token wallet 103 over the network 111, or for the electronic resource database 109 to access the blockchain 105 over the network 111. Computing environment 100 may include additional servers, computers, or other devices not shown.

Figure 2:
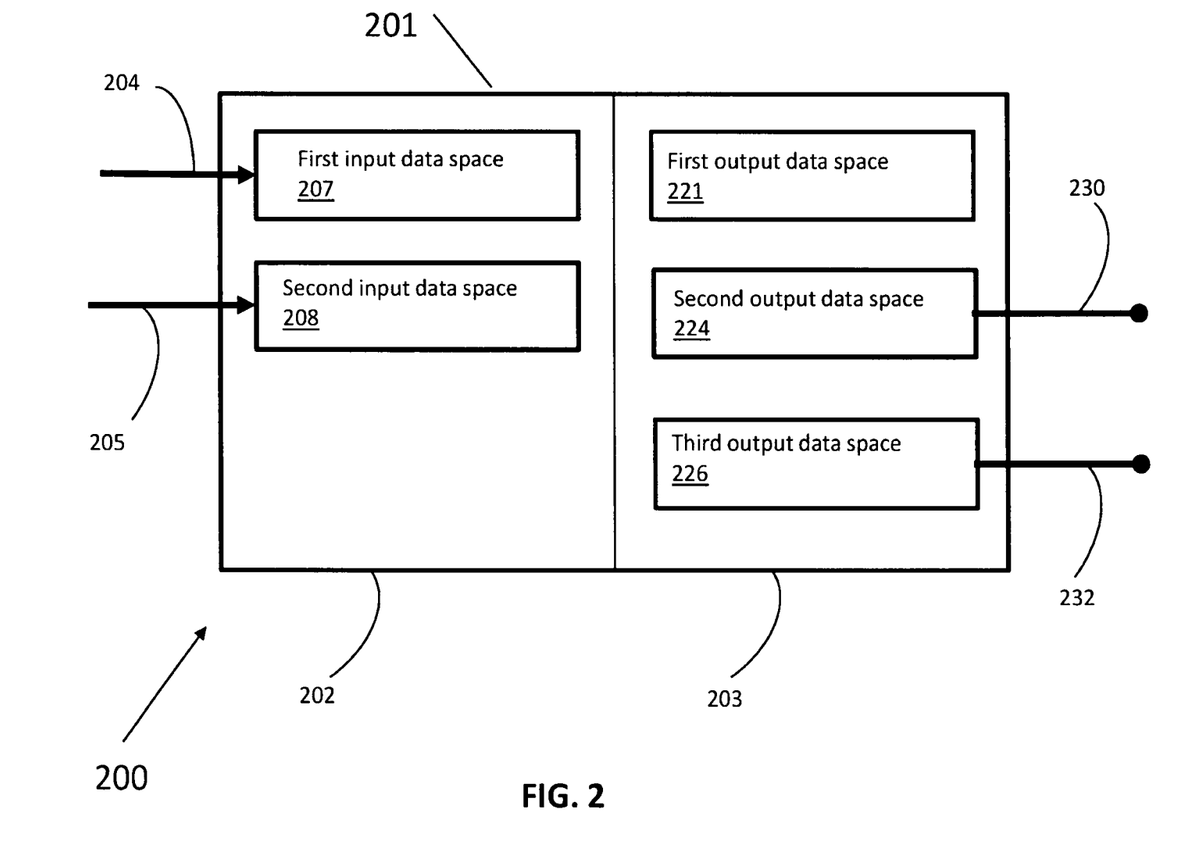
FIG. 2 block diagraph a schematic of an exemplary transaction formation associated with the creation of new fungible digital tokens, according to aspects of the present disclosure.

FIG. 2 block depicts a block diagram of an exemplary transaction formation associated with the creation of new fungible digital tokens, according to aspects of the present disclosure. Specifically shown, is a first transaction 200 on a blockchain having an output of a fungible digital token, in which the fungible digital token comprises a first transaction hash identifier. In FIG. 2, the first transaction data space 201 is shown. The first transaction dataspace includes inputs 202 and outputs 203. Inputs 202, such as input 204 and 205 may include an arbitrary number of inputs of a ledger's, or blockchain's, native digital asset. The native digital asset may be a cryptocurrency such Bitcoin, Ethereum, or Bitcoin Cash, to name a few. The first transaction dataspace 201 may include a plurality of input data space, such as the first input data space 207 or the second input data space 208, containing a digital signature or signature hash to unlock an unspent output. The outputs 203 of the first transaction data space 201 may include a plurality of output data spaces, including a first output data space 221 containing metadata describing attributes of token issuance metadata including the initial token quantity to be assigned to the next output, a second output data space 224 showing an output 230 of the transaction being unspent output containing a minimal ledger output amount to representing the newly created non-fungible tokens, a third output data space 226 containing a locking script with restrictions to spend, with the third output data space 226 showing an output 232 of the transaction being other arbitrary transaction output amounts, and network fees required to balance the ledger transaction.

In one exemplary embodiment, each NFTs may have their own unique ID and are grouped together by a group ID associated with a single Genesis event associated with a fungible token.

Figure 3:
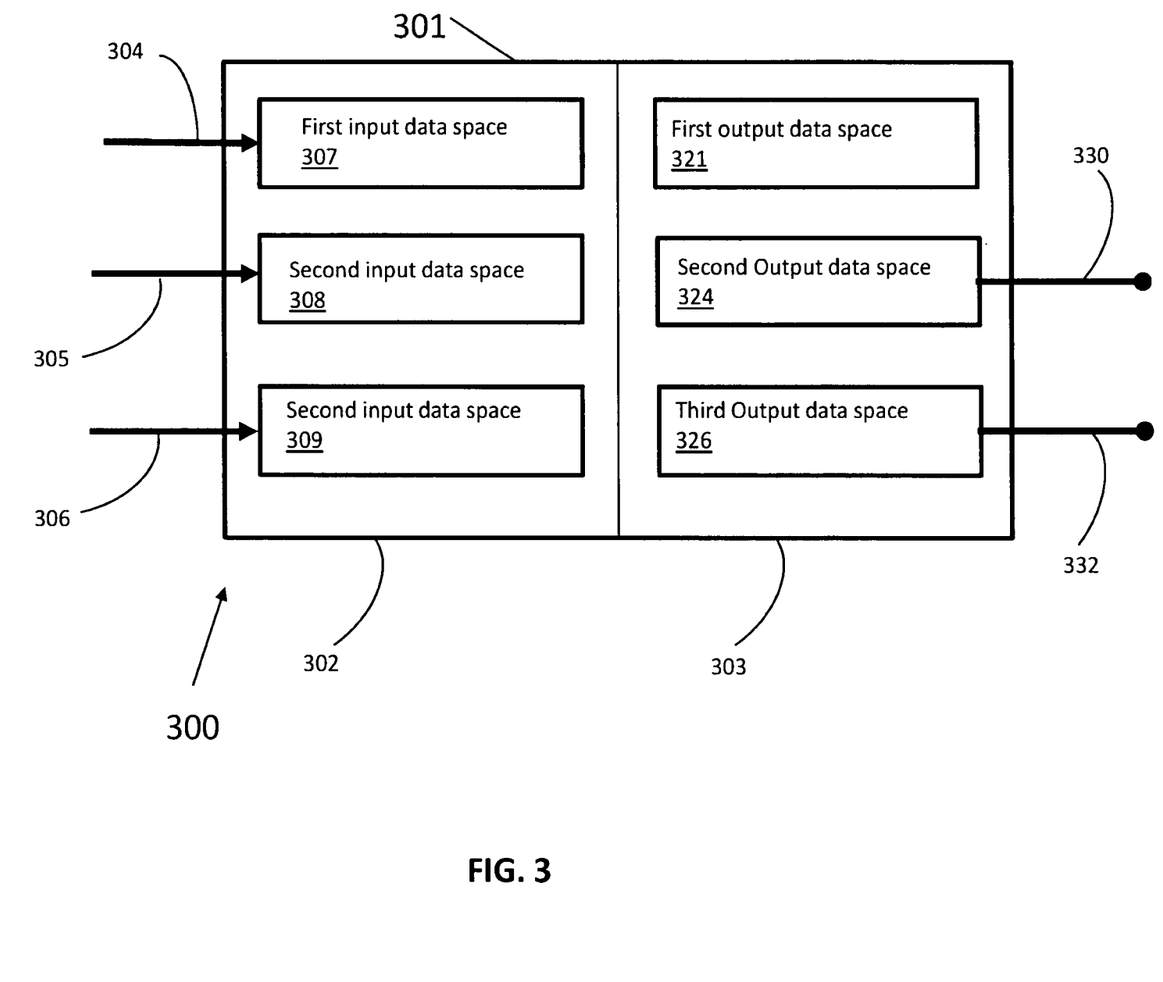
FIG. 3 depicts a block diagram of an exemplary transaction formation associated with the creation of a new non-fungible tokens belonging to and associated with to a specific group of non-fungible tokens, according to aspects of the present disclosure.

FIG. 3 depicts a block diagram of an exemplary transaction formation associated with the creation of a new non-fungible tokens belonging to and associated with to a specific group of non-fungible tokens, according to aspects of the present disclosure. Specifically, FIG. 3 depicts generating a second transaction 300 on the blockchain having an output of a non-fungible digital token and an input, in which the fungible digital token is spent as the input into the second transaction, the non-fungible digital token comprising a second transaction hash identifier and a group identifier associated with the first transaction hash identifier. As shown, in the second transaction data space 201, a variety of input may be spent into the second transaction, including a first input 304 that may be an output from a valid fungible non-fungible token group token output, or spent inputs 305 and 306, which may include an arbitrary number of inputs of the ledger's native digital asset. A first, second, or third 307, 308, 309 input data space shown on the second transaction data space 302 may include a digital signature or signature has to unlock an unspent output. The output 303 of the second transaction data space may include a first output data space containing metadata describing attributes of an NFT issuance metadata to be assigned to the next output, a second output data space 324 showing an output 330 of the transaction being an unspent output containing a minimal ledger output amount to representing the newly created non-fungible token, and a third output data space 326 containing a locking script with restriction to spend and showing an output 332 of the transaction being other arbitrary transaction output amounts, and network fees required to balance the ledger transaction.

Figure 4:
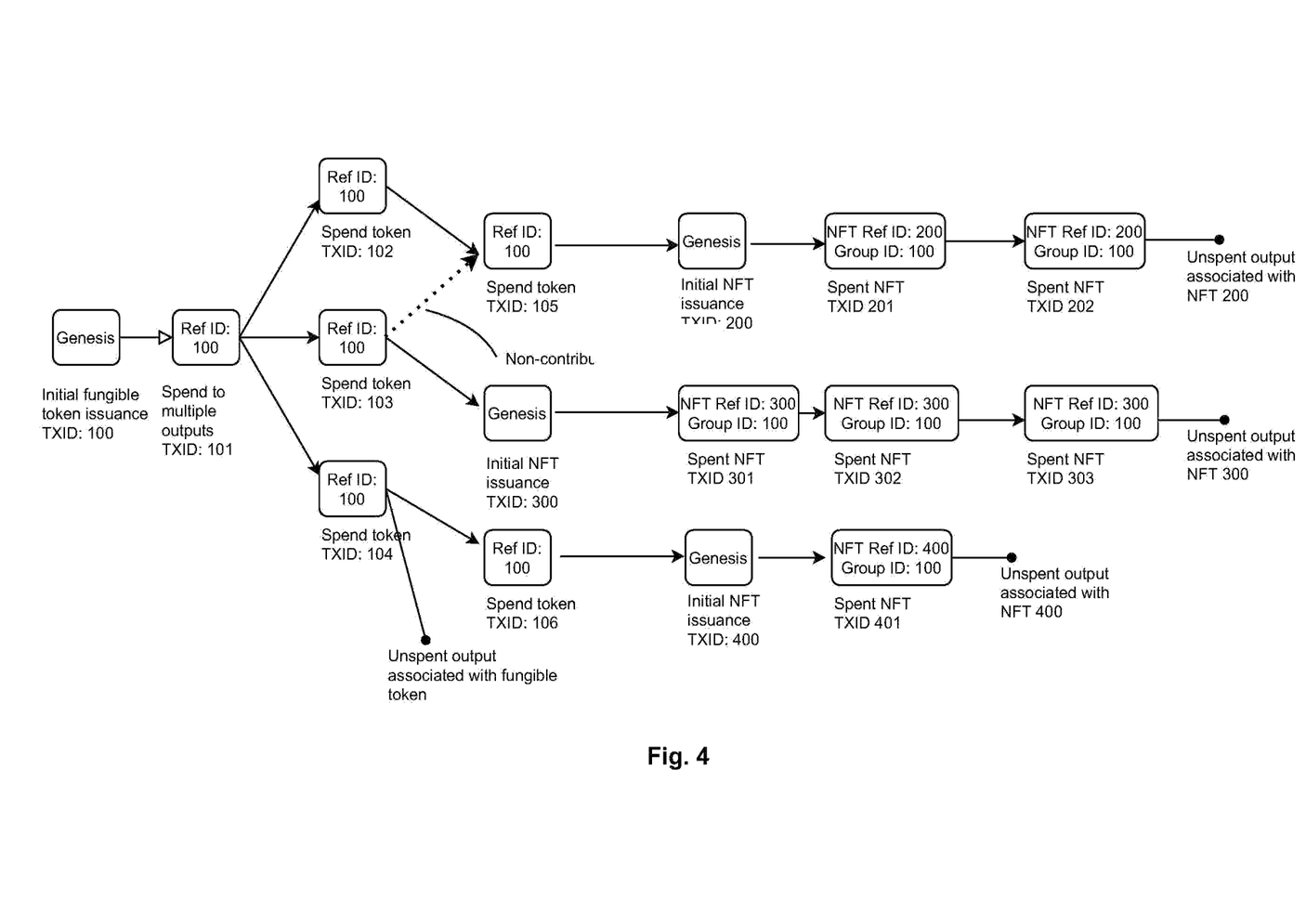
FIG. 4 depicts an example series of transactions demonstrating the creation of unique non-fungible tokens which are all related to the same parent group token.

FIG. 4 depicts an example series of transactions demonstrating the creation of unique non-fungible tokens which are all related to the same parent group token. Specifically shown are a series of transactions associated with the creation and transfer of non-fungible tokens which belong to the same group. Each NFT is shown in gray has a unique identifier, or second hash transaction has identifier, such as NFT Ref ID's 100, 200, 300, 400, with all NFTs belonging to Group ID 100, which is associated with the fungible token genesis event TXID: 100. In FIG. 4, the dashed arrows represent a non-contributing input to the grouped NFT's Genesis since another input providing the linkage to the Genesis TXID 100 is already shown.

Figure 5:
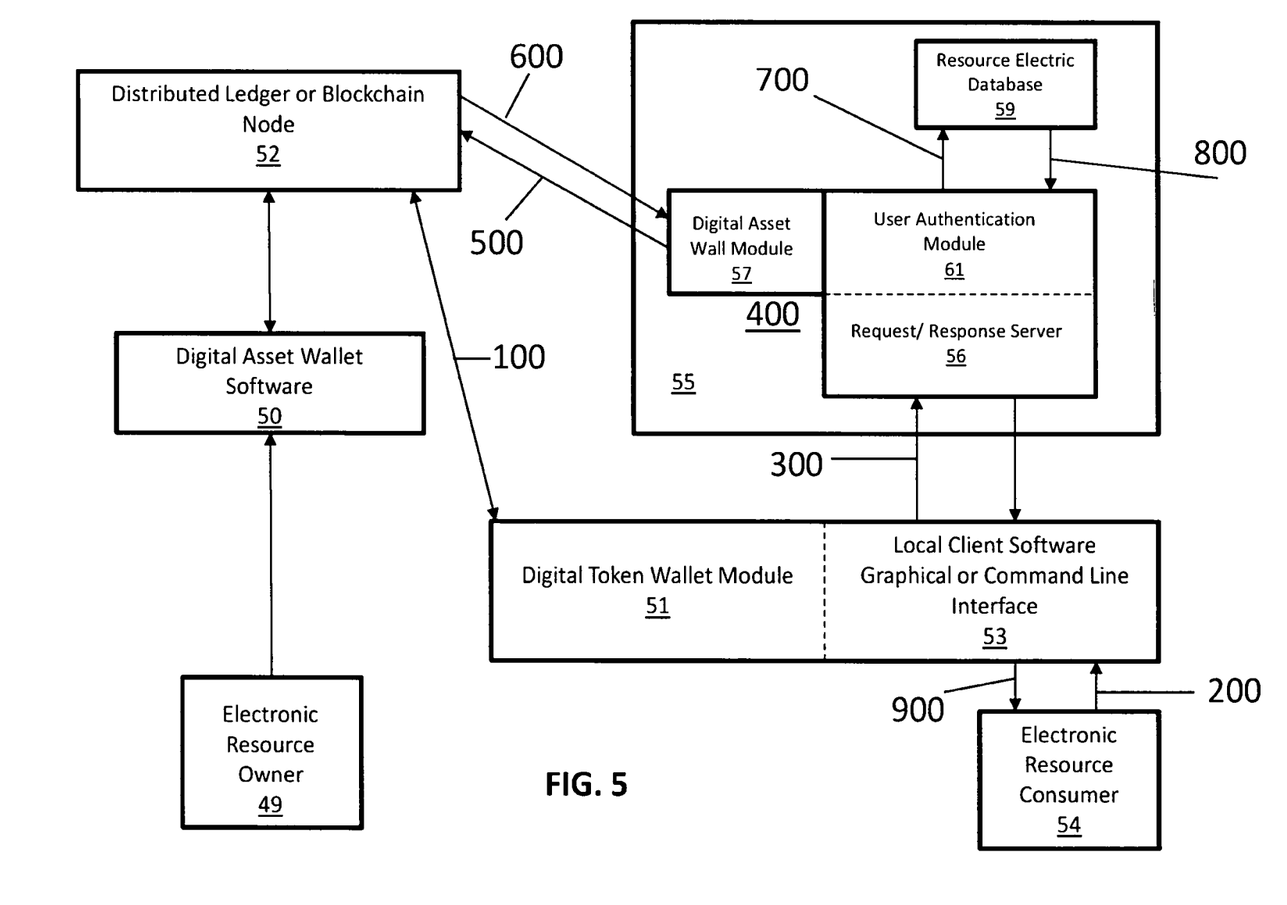
FIG. 5 depicts a flow chart of an exemplary system for access control and authentication for validating user access to an electronic resource, according to aspects of the present disclosure.

FIG. 5 depicts a flow chart of an exemplary system for access control and authentication for validating user access to an electronic resource, according to aspects of the present disclosure. At step 100, a digital token wallet Module 51, of the client software 53, is synchronized with the with the distributed ledger or blockchain node 52 and the local client software graphical or command-line interface (of the client software 53) displayed on a user system informs a user, or electronic resource consumer 54, of the user system which electronic resources such as an asset may be accessed based on the wallet's 50 balance of non-fungible tokens.

At step 200, the user 54 selects one or more electronic resource(s), or assets, to access using the client software 53.

At step 300, the client software 53 creates a new transaction to spend one or more non-fungible tokens associated with electronic resource, or asset, that the user has requested access to. This transaction is not broadcasted, or recorded, to the distributed ledger network 52, and is only sent to a request/response server 56 of a remote software application 55 that will provide the desired electronic resource or asset.

At step 400, the remote software application 55, specifically, a user authorization module 61 of the remote software application, looks up the electronic resource, or asset, associated with each transaction input's unique NFT token ID (or group ID). If the electronic resource, or asset, is available for the user then the remote software application 55 adds its own signed input to the transaction. Adding an input to the transaction will make the transaction hash unique for the authentication process. A side benefit of adding an input is the user does not need to pay for the transaction fees associated with the distributed ledger or blockchain. The exact form and destination of transaction outputs may vary depending on the type of electronic resource, or asset, being served in the application.

At step 500, the remote software application 55, and specifically, a digital asset wallet module 57 of the remote software application 55, submits the transaction to the distributed ledger or blockchain network for acceptance.

At step 600, if the transaction is accepted, then the software application will consider the user to be authenticated and authorized to receive access to the electronic resource, or asset. If any of the NFT inputs have already been spent, the ledger network will reject the transaction and the user's access to the resource will be denied and result in an error message returned to the client software 53.

At step 700, after atheization is successful, the remote application 55 will fetch the electronic resource, or asset, from a database 59, memory store, or file system so they can be returned to user.

At step 800, a final response is returned to, and displayed on, the client software 53 containing requested electronic resource, or asset, and if the authentication failed an error message is displayed.

At step 900, the client software 900 presents the electronic resource to the user when it is available.

Figure 6:
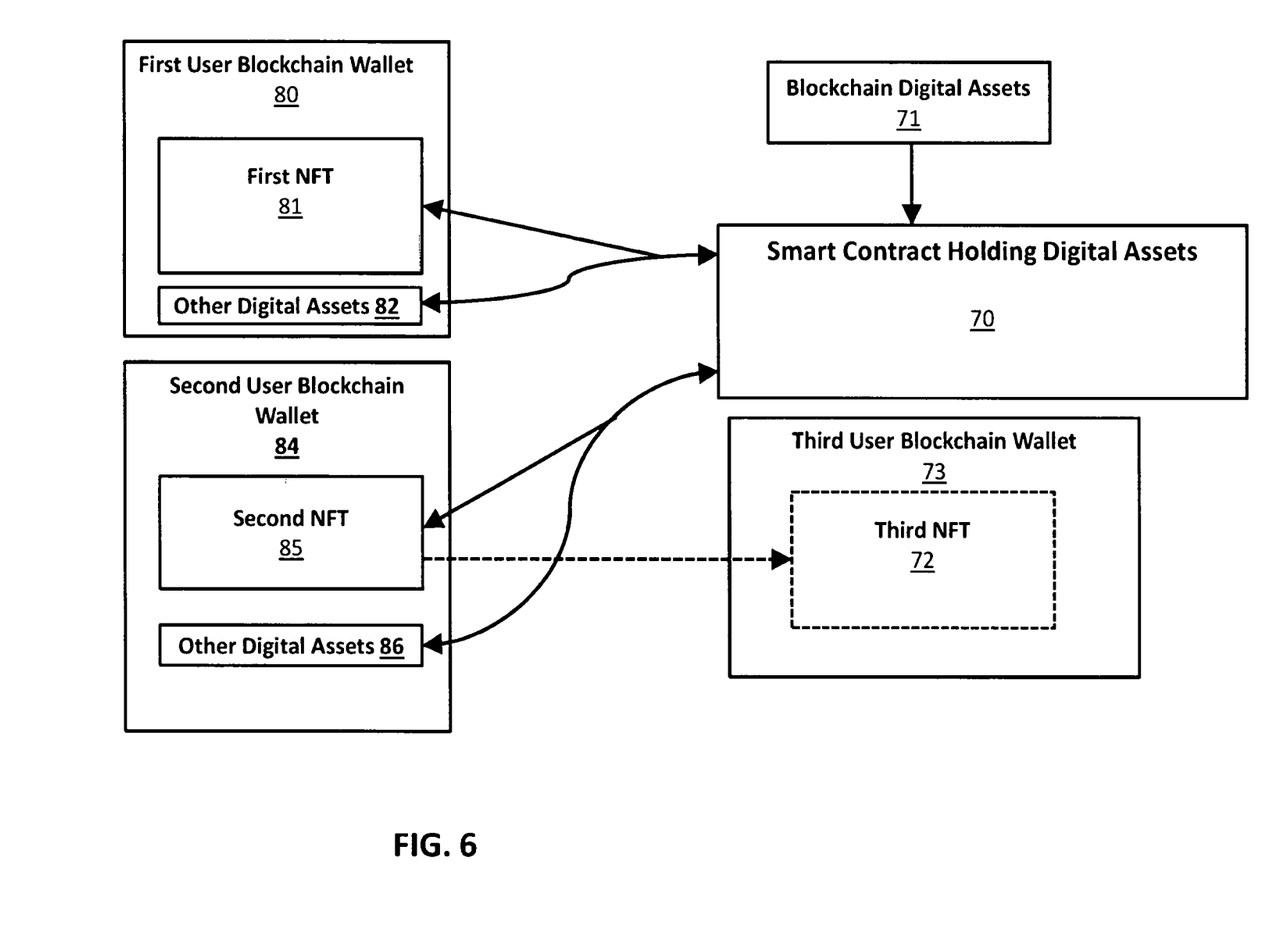
FIG. 6 depicts a flow chart of an exemplary authentication method for using non-fungible tokens to provide access privileges to digital assets secured by a smart contract.

FIG. 6 depicts a flow chart of an exemplary authentication method for using non-fungible tokens to provide access privileges to digital assets secured by a smart contract 70. Specifically figured, is method for using a smart contract 70 and one or more non-fungible tokens 72, 81, 85 to authenticate access to a digital asset, the method including generating a first transaction on a blockchain having an output of a non-fungible digital token, in which the non-fungible digital token comprises a transaction hash identifier, generating a smart contract 70 on a blockchain for the purpose of storing the digital asset, such as digital asset 71, 82, or 86, in which the smart contract requires possession or proof of control the non-fungible token to be allowed access and withdraw of said stored digital asset, and submitting one or more transactions, on behalf of an owner of the non-fungible digital token, to transfer the digital asset from the smart contract to a different blockchain location, blockchain wallet 73, 80, 84, address, or smart contract.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A method for using a non-fungible token to authenticate access to an asset, the method being implemented on a computer system having one or more physical processors configured by machine-readable instructions which, when executed, perform the method, the method comprising:

generating a first transaction on a blockchain having an output of a fungible digital token, in which the fungible digital token comprises a first transaction hash identifier;

generating a second transaction on the blockchain having an output of a non-fungible digital token and an input, in which the fungible digital token is spent as the input into the second transaction, the non-fungible digital token comprising a second transaction hash identifier and a group identifier associated with the first transaction hash identifier;

requesting access from a user system to an electronic resource database, in which electronic resource database comprises the asset and access is granted to the electronic resource database based on the second transaction hash identifier and the group identifier;

generating a third transaction on the electronic resource database to spend the non-fungible digital asset, in which the non-fungible asset is the input and the digital asset is the output, and the transaction creating a third transaction hash identifier;

adding a signed input to the third transaction hash identifier;

submitting the third transaction hash identifier to the blockchain for acceptance; and delivering the asset.

2. The method of claim 1, in which after generating the first transaction, assigning the first transaction hash identifier associated with the fungible digital token with an identifier associated with the asset.

3. The method of claim 1, in which after generating the first transaction, assigning the first transaction hash identifier associated with the fungible digital token with a cryptographic public key associated with the digital token wallet.

4. The method of claim 1, in which after generating the second transaction, the second transaction hash identifier and group identifier of the non-fungible digital token are assigned to a cryptographic public key associated with a digital token wallet.

5. The method of claim 4, in which before requesting access, the user system is synced with the digital token wallet.

6. The method of claim 1, in which the third transaction is not broadcasted on the blockchain.

7. The method of claim 1, in which the resource database is configured to deny access to the asset.

8. The method of claim 1, in which adding a signed input to the third transaction hash identifier creates a unique transaction ID.

9. The method of claim 1, in which after submitting the third transaction hash identifier to the blockchain for acceptance, the electronic resource database retrieves the asset from a database, memory store, or file system.

* * * * *